(12) United States Patent
Yi

(10) Patent No.: US 10,079,689 B2
(45) Date of Patent: Sep. 18, 2018

(54) METHOD FOR REALIZING SMART HOME SERVICE, SMART HOME TERMINAL AND SERVICE HOTSPOTS

(71) Applicant: ZTE CORPORATION, Shenzhen, Guangdong Province (CN)

(72) Inventor: Xingwang Yi, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 290 days.

(21) Appl. No.: 14/902,343

(22) PCT Filed: Mar. 31, 2014

(86) PCT No.: PCT/CN2014/074445
§ 371 (c)(1),
(2) Date: Dec. 31, 2015

(87) PCT Pub. No.: WO2014/169759
PCT Pub. Date: Oct. 23, 2014

(65) Prior Publication Data
US 2016/0182248 A1    Jun. 23, 2016

(30) Foreign Application Priority Data

Jul. 1, 2013  (CN) .......................... 2013 1 0274687

(51) Int. Cl.
*G06F 15/16*     (2006.01)
*H04L 12/28*     (2006.01)
(Continued)

(52) U.S. Cl.
CPC ...... *H04L 12/2807* (2013.01); *H04L 12/2814* (2013.01); *H04L 41/082* (2013.01);
(Continued)

(58) Field of Classification Search
CPC .. H04L 12/16; H04L 12/2803–12/2807; H04L 12/2814–12/2816;
(Continued)

(56) References Cited

U.S. PATENT DOCUMENTS 7,627,679 B1    12/2009  Bowen et al.
7,970,914 B2 *   6/2011  Bowen ................ H04L 41/5054
                                                    370/252

(Continued)

FOREIGN PATENT DOCUMENTS

CN    101119180 A    2/2008
CN    102694870 A    9/2012
EP      2328088 A1    6/2011

*Primary Examiner* — Brendan Higa
(74) *Attorney, Agent, or Firm* — Ling Wu; Stephen Yang; Ling and Yang Intellectual Property

(57) ABSTRACT

Disclosed are a method for realizing smart home service, a smart home terminal and service hotspot, wherein the method includes: a smart home terminal scanning service hotspots and accessing a first scanned service hotspot; after accessing the first service hotspot, the smart home terminal acquiring an available service list from the first service hotspot, requesting the first service hotspot for a download address of a service component to be used according to the acquired available service list, if it needs to download or update the service component to be used, then downloading or updating and installing the service component according to the download address, and loading the service component to be used; the smart home terminal receiving data transmitted from peripherals, selecting an corresponding service component to send the data sent by peripherals to the first service hotspot and receiving a data processing result returned by the first service hotspot.

10 Claims, 2 Drawing Sheets

(51) Int. Cl.
*H04L 12/24* (2006.01)
*H04L 29/08* (2006.01)
(52) U.S. Cl.
CPC ........ *H04L 41/0806* (2013.01); *H04L 67/125* (2013.01); *H04L 67/16* (2013.01); *H04L 67/34* (2013.01)
(58) Field of Classification Search
CPC .... H04L 41/08–41/082; H04L 41/0883; H04L 65/40; H04L 67/16; H04M 3/42; G06F 8/60; G06F 8/70–8/71
See application file for complete search history.

(56) References Cited

U.S. PATENT DOCUMENTS

| | | |
|---|---|---|
| 2003/0195925 A1 | 10/2003 | Kaneko et al. |
| 2004/0249924 A1 | 12/2004 | Watanabe et al. |
| 2007/0008919 A1* | 1/2007 | Chiu .................. H04W 84/12 370/328 |
| 2012/0317247 A1 | 12/2012 | Dattagupta et al. |
| 2012/0317254 A1 | 12/2012 | Chekhanovskiy et al. |
| 2014/0164106 A1* | 6/2014 | Naik .................. G06Q 30/0277 705/14.49 |
| 2015/0043377 A1* | 2/2015 | Cholas .................. H04W 48/08 370/254 |

* cited by examiner

METHOD FOR REALIZING SMART HOME SERVICE, SMART HOME TERMINAL AND SERVICE HOTSPOTS

TECHNICAL FIELD

The present document relates to the field of smart home technologies, and more particularly, to a method for realizing smart home service, a smart home terminal and a services hotspot.

BACKGROUND OF THE INVENTION

The smart home service system is usually provided with a unified interface address by the service provider, then each smart home terminal presets the interface address in the firmware when the smart home terminal leaves a factory, and the smart home terminal actively initiates a connection to this interface address and performs data interaction when it is booting up.

But the smart home service system software and the terminal-end software are relatively fixed, so there are following problems:

(1) the smart home terminal only interacts with fixed smart home service systems, if the user wants to use services provided by other service providers, the user has to replace it with a new terminal;

(2) if a new service is released, the server-end software has to be changed;

(3) even if new services are released by updating the service-end software, an existing smart home terminal cannot use these newly released services.

In short, the current smart home service system does not have the flexibility and reusability.

SUMMARY

To solve the technical problem, the present document is to provide a method for realizing smart home service, a smart home device and a service hotspot, to enable the flexibility and reusability of the smart home service.

To solve the abovementioned technical problem, a method for realizing smart home service in accordance with the present document comprises:

a smart home terminal scanning service hotspots and accessing to a first scanned service hotspot;

after accessing to the first service hotspot, the smart home terminal acquiring an available service list from the first service hotspot, and requesting the first service hotspot for a download address of a service component to be used according to the acquired available service list, and if the service component to be used needs to be downloaded or updated, downloading or updating and installing the service component to be used according to the download address, and then loading the service component to be used;

the smart home terminal receiving data sent by peripherals, selecting a corresponding service component to send the data sent by the peripherals to the first service hotspot, and receiving a data processing result returned by the first service hotspot.

Preferably, said requesting the first service hotspot for a download address of a service component to be used according to the acquired available service list comprises:

the smart home terminal selecting a service component to be used according to the available service list, and notifying the first service hotspot of the service component to be used, a communication mode supported by itself and a version of the service component which has been installed by itself, and requesting the download address of the service component to be used.

Preferably, said accessing to a first scanned service hotspot comprises:

after scanning the service hotspots, the smart home terminal displaying the scanned service hotspots to a user, taking a service hotspot selected by the user as the first service hotspot, or taking a preset service hotspot included in the scanned service hotspots as the first service hotspot, and accessing to the first service hotspot.

Preferably, the method further comprises:

the smart home terminal and the first service hotspot respectively performing a data cleaning after the smart home terminal disconnects from the first service hotspot.

A method for realizing smart home service, comprises:

a service hotspot interacting with a smart home terminal to complete an access of the smart home terminal;

after the smart home terminal accesses, the service hotspot releasing an available service list and a download address of a service component to be used by the smart home terminal to the smart home terminal according to a request from the smart home terminal, and if the smart home terminal downloads or updates the service component to be used, providing the smart home terminal with download or update of the service component to be used;

the service hotspot receiving data sent by the smart home terminal, selecting a corresponding service component for data processing, and returning a data processing result to the smart home terminal.

Preferably, the service hotspot releasing a download address of a service component to be used by the smart home terminal to the smart home terminal according to a request from the smart home terminal comprises:

the service hotspot releasing the download address of the service component to be used by the smart home terminal to the smart home terminal according to the service component to be used acquired from the smart home terminal, a supported communication mode and a version of an installed service component.

A smart home terminal, comprises: an access module, a component management module and a service module, wherein:

the access module is configured to: scan services hotspots and access to a first scanned service hotspot;

the component management module is configured to: after the access module accesses to the first service hotspot, acquire an available service list from the first service hotspot, and request the first service hotspot for a download address of a service component to be used according to the acquired available service list, and if the service component to be used needs to be downloaded or updated, download or update and install the service component to be used according to the download address, and then load the service component to be used;

the service module is configured to: receive data sent by peripherals, select a corresponding service component to send the data sent by the peripherals to the first service hotspot, and receive a data processing result returned by the first service hotspot.

Preferably, the component management module is configured to: select a service component to be used according to the available service list, notify the first service hotspot of the service component to be used, a communication mode supported by itself and a version of the service component which has been installed by itself, and request a download address of the service component to be used.

A smart home service hotspot, comprises: a hotspot deployment and session management module, a content releasing module, a service processing module and an interconnecting module, wherein the hotspot deployment and session management module, the content releasing module and the service processing modules are respectively connected with the interconnecting module, wherein:

the hotspot deployment and session management module is configured to: interact with a smart home terminal, and complete an access of the smart home terminal;

the content releasing module is configured to: after the smart home terminal accesses, release an available service list and a download address of a service component to be used by the smart home terminal to the smart home terminal according to a request from the smart home terminal, and if the smart home terminal downloads or updates the service component to be used, provide the smart home terminal with download or update of the service component to be used;

the service processing module is configured to: receive data sent by the smart home terminal, select a corresponding service component to process the data, and return a data processing result to the smart home terminal;

The interconnecting module is configured to: exchange data between the hotspot deployment and session management module, the content releasing module and the service processing module.

Preferably, the content releasing module is configured to: release a download address of the service component to be used by the smart home terminal to the smart home terminal according to the service component to be used acquired from the smart home terminal, a supported communication mode and a version of the installed service component.

In summary, the embodiment of the present document realizes the smart home service through the smart home service hotspots and service components, makes the smart home service more flexible and reusable, and can release new services without changing the service-end software, and also enables the terminal to use the newly released services without changing to a new smart home terminal.

PREFERRED EMBODIMENTS OF THE INVENTION

The smart home service system in the present embodiment comprises: smart home service hotspots (hereinafter referred to as service hotspots or hotspots) and smart home terminals.

The interaction between the smart home terminals and the service hotspots comprises four phases: the phase of hotspot discovery and access, the phase of service component download, the phase of normal work and the phase of work termination.

The phase of hotspot discovery and access: in this phase, the smart home terminal scans service hotspots and selects one service hotspot to access, while provides the corresponding authentication information for the service hotspot to verify.

The phase of service component download: after accessing to the first service hotspot, the smart home terminal acquires an available service list and a download address of the service component to be used from the service hotspot, then downloads or updates the service components to be used, and installs the service component after downloading or updating the service component to be used, and loads the service component to be used after the installation; if there is no need to download or update, then directly loads the service component to be used.

The phase of normal work: after downloading or updating the service component, the terminal immediately enters into the phase of normal work, in this phase, if receiving data sent by peripherals, the smart home terminal calls the interface of the corresponding component and reports the data to the service hotspot to process.

The phase of work termination: it is divided into the active termination and the passive termination. The active termination refers to that the user shuts down the terminal, the user actively disconnects from the service hotspot; the passive termination refers to that the communication between the smart home terminal and the service hotspot is abnormal, the smart home terminal powers off, and so on. In this phase, the service hotspot and the smart home terminal both need to do some data cleaning. In this phase, the smart home terminal selects whether to re-enter the phase of hotspot discovery and access according to the actual situation.

Hereinafter in conjunction with the accompanying figures, embodiments of the present application will be described in detail. It should be noted that in the case of no conflict, embodiments and features in the embodiments of the present application may be arbitrarily combined with each other.

Figure 1:
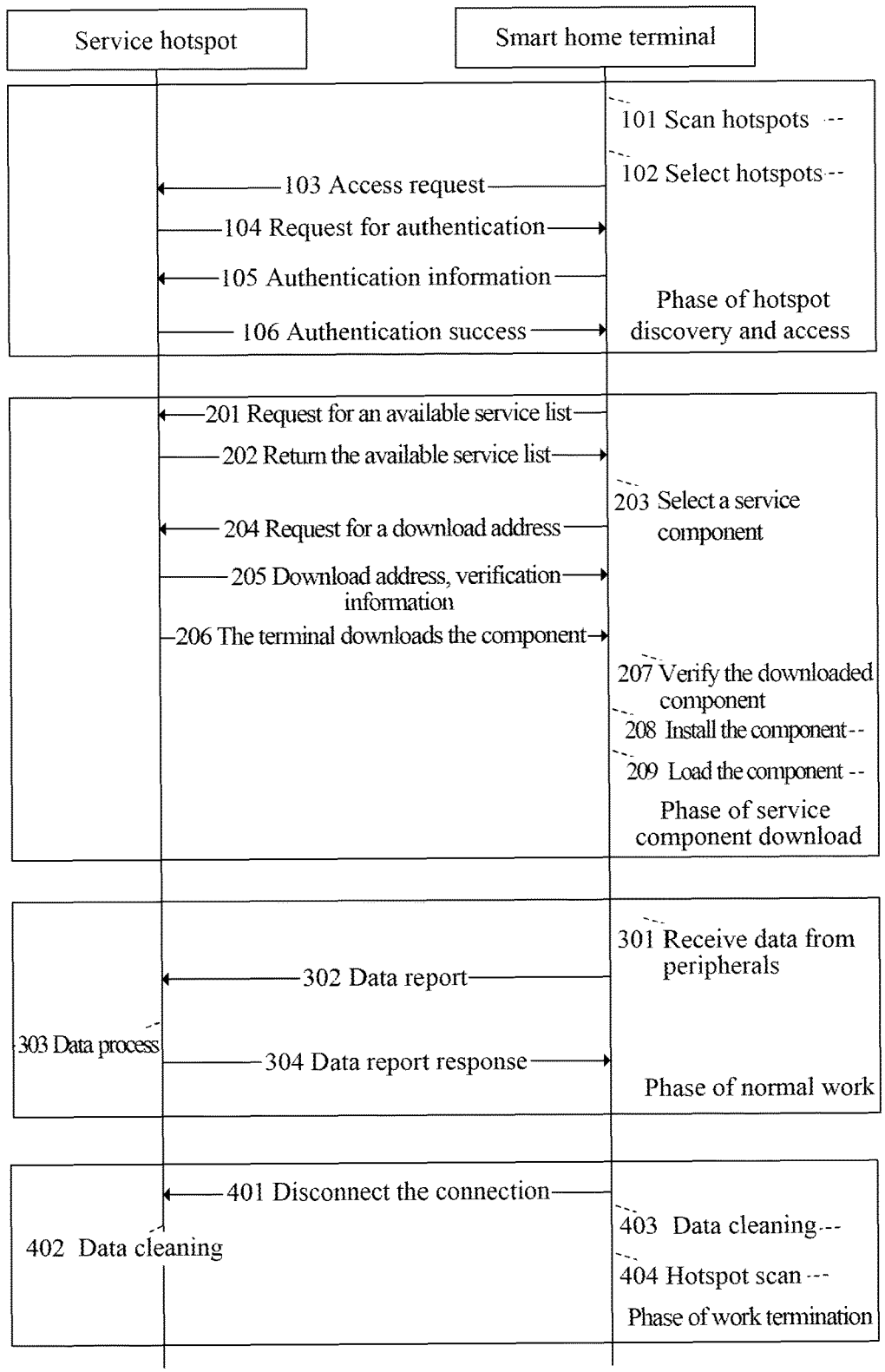
FIG. 1 is a flow chart of a method for realizing smart home service in accordance with an embodiment of the present document.

As shown in FIG. 1, the method for realizing smart home service in accordance with the present embodiment comprises:

(A) The phase of service hotspot discovery and access:

in step 101: the smart home terminal scans service hotspots;

in step 102: the smart home terminal displays the scanned service hotspots to the user, selects the first service hotspot selected by the user to access, and in the case that the user has preset the first service hotspot to access, the smart home terminal automatically selects the preset first service hotspot;

In this embodiment, in the case that the first service hotspot to be accessed is not preset, the user is required to select the first service hotspot through the smart home terminal, in case that the first service hotspot is preset, the smart home terminal directly selects the first service hotspot to access.

In step 103: the smart home terminal sends an access request to the first service hotspot to request for accessing to the first service hotspot;

in step 104: after receiving the access request, the first service hotspot requires the smart home terminal to authenticate, accompanying with the information encryption way;

in step 105: the smart home terminal sends the authentication information in cipher text to the first service hotspot, in the case that the user has preset the first service hotspot, the smart home terminal directly sends the authentication information to the first service hotspot, in the case that the user has not preset the first service hotspot, the smart home terminal sends the authentication information input by the user to the first service hotspot;

in step 106: the first service hotspot returns an authentication result according to the authentication information after the user information of the smart home terminal is authenticated successfully;

(B) The phase of service component download:

in step 201: the smart home terminal requests an available service list from the first service hotspot after accessing successfully;

in step 202: the first service hotspot returns the available service list to the smart home terminal;

in step 203: the smart home terminal selects a service component to be used according to the available service list, in the case that the user has preset the service component to be used, the smart home terminal selects the preset service component by itself, in the case that the user has not preset the service component to be used, the smart home terminal selects the service component selected by the user;

in step 204: the smart home terminal notifies the first service hotspot of the service component to be used, the communication mode supported by itself, and the version of the service component installed by itself, and requests for the download address of the service component to be used;

in step 205: the first service hotspot returns the download address of the service component to be used and the corresponding verification information (verification mode, check code) to the smart home terminal according to the service component to be used by the smart home terminal, the supported communication mode and the version of the installed service component;

in step 206: when the smart home terminal needs to download or update the service component to be used, it downloads or updates the service component to be used according to the download address returned by the first service hotspot;

the first service hotspot provides the smart home terminal with the download or update of the service component to be used.

In the present embodiment, the first service hotspot can judge whether the smart home terminal needs to download or update the service component to be used according to the version of the service component installed by the smart home terminal, and indicates the smart home terminal whether to download or update; or the smart home terminal judges whether it needs to download and then update the service component to be used according to the version of the installed service component after receiving the download address.

In step 207: After downloading or updating the service component to be used, the smart home terminal uses the verification information returned by the first service hotspot for verifying the downloaded service component;

in step 208: the smart home terminal installs the service component after successfully verifying the downloaded service component;

in step 209: after installing the service component successfully, the smart home terminal loads the service component to be used.

(Iii) The phase of normal work in step 301: the smart home terminal receives data sent by a peripheral;

in step 302: the smart home terminal selects the corresponding service component according to the peripheral type and the data type, and sends data sent by the peripheral to the first service hotspot through an interface of the service component;

in step 303: after receiving the data, the first service hotspot selects the corresponding service component to process the data;

in step 304: the first service hotspot returns a data processing result to the smart home terminal after processing the data.

(D) The phase of work termination:

in step 401: the smart home terminal disconnects from the first service hotspot;

in step 402: the first service hotspot performs the data cleaning work;

in step 403: the smart home terminal performs the data cleaning work;

in step 404: the smart home terminal selects whether to re-discover and re-access the service hotspot according to the actual situation.

The smart home terminal of the present embodiment completes discovery and access of a smart home service hotspot, downloads and loads a smart home service component according to its own device, and provides a human-machine interface to the user when necessary.

Figure 2:
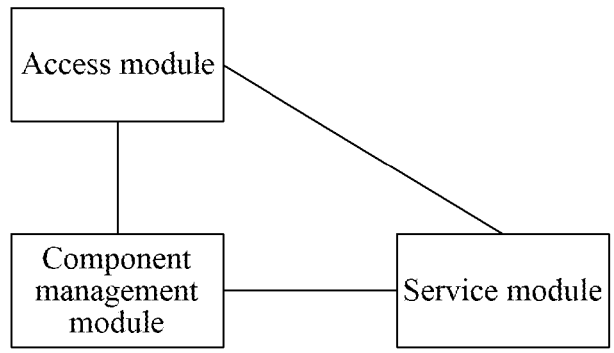
FIG. 2 is an architectural diagram of a smart home terminal in accordance with an embodiment of the present document.

As shown in FIG. 2, the smart home terminal according to the present embodiment comprises: an access module, a component management module and a service module, wherein:

the access module is used to scan service hotspots and access to a first scanned service hotspot;

the component management module is used to: after the access module accesses to the first service hotspot, acquire an available service list from the first service hotspot, and request the first service hotspot for a download address of the service component to be used according to the acquired available service list, and download or update and install the service component to be used according to the download address if the service component to be used needs to be downloaded or updated, and then load the service component to be used;

the service module is used to receive data sent by peripherals, select a corresponding service component to send the data sent by the peripherals to the first service hotspot, and receive a data processing result returned by the first service hotspot.

The component management module is specifically used to: select the service component to be used according to the available service list, and notify the first service hotspot of the service component to be used, the communication mode supported by itself and the version of the service component which has been installed by itself, and request a download address of the service component to be used.

The access module is specifically used to: after scanning the service hotspots, display the scanned service hotspots to the user, take the service hotspot selected by the user as the first service hotspot, or take a preset service hotspot included in the scanned service hotspots as the first service hotspot, and access to the first service hotspot.

The service module is further used to perform a data cleaning after being disconnected from the first service hotspot.

The operating system of the smart home terminal according to the present embodiment provides terminal applications with functions such as device management, memory management, power management, wireless communication interface, Ethernet communication interface, WIFI communication interface, infrared communication interface, and Bluetooth interface.

Figure 3:
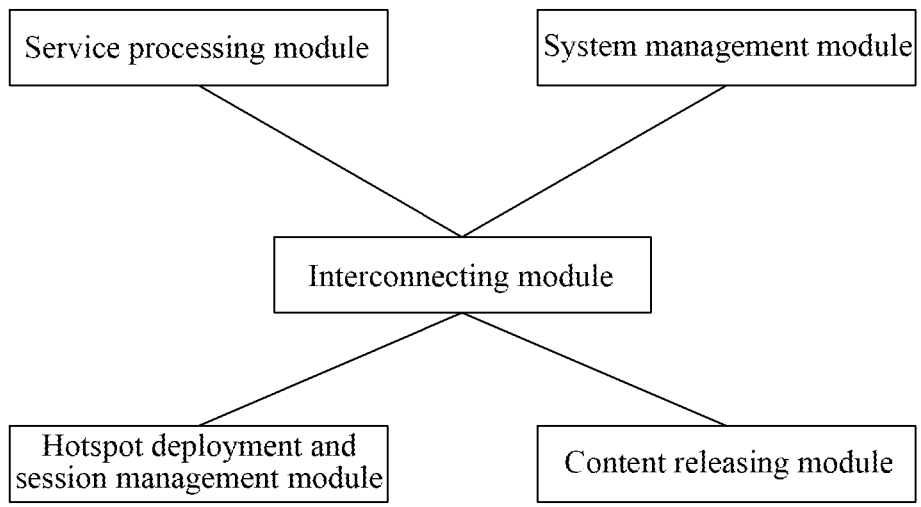
FIG. 3 is an architectural diagram of a smart home service hotspot in accordance with an embodiment of the present document.

As shown in FIG. 3, the smart home service hotspot according to the present embodiment comprises: a hotspot deployment and session management module, a content releasing module, a service processing module and an interconnecting module, the hotspot deployment and session management module, the content releasing module and the service processing modules are respectively connected to the interconnecting module, wherein:

the hotspot deployment and session management module is used for the smart home service hotspot deployment and session management, the smart home terminal searches for the hotspot and interacts with the module to complete the access of the smart home terminal;

the content releasing module is used to release and update for the service components at the smart home terminal side, after the smart home terminal accesses, release an available service list and a download address of the service component to be used by the smart home terminal to the smart home terminal according to a request from the smart home terminal, and if the smart home terminal downloads or updates the service component to be used, then provide the smart home terminal with the download or update of the service component to be used;

the service processing module is used to maintain the service components at the service hotspot side, receive the data sent by the smart home terminal, select a corresponding service component to process the data, and return a data processing result to the smart home terminal;

the interconnecting module is used to exchange data between the hotspot deployment and session management module, the content releasing module and the service processing module.

The smart home service hotspot further comprises a system management module, used to manage the system at the entire service hotspots side.

The content releasing module is further used to: release the download address of the service component to be used by the smart home terminal to the smart home terminal according to the service component to be used acquired from the smart home terminal, the supported communication mode and the version of the installed service component.

Those ordinarily skilled in the art can understand that all or some of steps of the abovementioned method may be completed by the programs instructing the relevant hardware, and the programs may be stored in a computer-readable storage medium, such as read only memory, magnetic or optical disk. Alternatively, all or some of the steps of the abovementioned embodiments may also be implemented by using one or more integrated circuits. Accordingly, each module/unit in the abovementioned embodiments may be realized in a form of hardware, or in a form of software function modules. The present document is not limited to any specific form of hardware and software combinations.

The above description is only preferred embodiments of the present application and is not used to limit the present application. For a person skilled in the art, the present application may have a variety of modifications and changes. Any changes, equivalent replacements and improvements made within the spirit and principle of the present application should be included within the protection scope of the present application.

INDUSTRIAL APPLICABILITY

The embodiment of the present document realizes the smart home service through the smart home service hotspots and service components, makes the smart home service more flexible and reusable, and can release new services without changing the service-end software, and also enables the terminal to use the newly released services without changing to a new smart home terminal.

What is claimed is:

1. A method for realizing smart home service, comprising:
a smart home terminal scanning service hotspots and accessing a first scanned service hotspot;
after accessing the first service hotspot, the smart home terminal acquiring an available service list from the first service hotspot, and requesting the first service hotspot for a download address of a service component to be used according to the acquired available service list, and if the service component to be used needs to be downloaded or updated, downloading or updating and installing the service component to be used according to the download address, and then loading the service component to be used;
the smart home terminal receiving data sent by peripherals, selecting a corresponding service component to send the data sent by the peripherals to the first service hotspot, and receiving a data processing result returned by the first service hotspot.

2. The method of claim 1, wherein, said requesting the first service hotspot for a download address of a service component to be used according to the acquired available service list comprises:
the smart home terminal selecting a service component to be used according to the available service list, and notifying the first service hotspot of the service component to be used, a communication mode supported by the smart home terminal and a version of the service component which has been installed by the smart home terminal, and requesting the download address of the service component to be used.

3. The method of claim 1, wherein, said accessing to a first scanned service hotspot comprises:
after scanning the service hotspots, the smart home terminal displaying the scanned service hotspots to a user, taking a service hotspot selected by the user as the first service hotspot, or taking a preset service hotspot included in the scanned service hotspots as the first service hotspot, and accessing to the first service hotspot.

4. The method of claim 1, wherein, the method further comprises:
the smart home terminal and the first service hotspot performing data cleaning respectively after the smart home terminal disconnects from the first service hotspot.

5. A method for realizing smart home service, comprising:
a service hotspot interacting with a smart home terminal to complete an access of the smart home terminal;
after the smart home terminal accesses, the service hotspot releasing an available service list and a download address of a service component to be used by the smart home terminal to the smart home terminal according to a request from the smart home terminal, and if the smart home terminal downloads or updates the service component to be used, providing the smart home terminal with download or update of the service component to be used;
the service hotspot receiving data sent by the smart home terminal, selecting a corresponding service component for data processing, and returning a data processing result to the smart home terminal.

6. The method of claim 5, wherein, the service hotspot releasing the download address of the service component to be used by the smart home terminal to the smart home terminal according to a request from the smart home terminal comprises:

the service hotspot releasing the download address of the service component to be used by the smart home terminal to the smart home terminal according to the service component to be used acquired from the smart home terminal, a supported communication mode and a version of an installed service component.

7. A smart home terminal, comprising: a processor; and a memory storing software modules to be executed by said processor, the software modules comprising: an access module, a component management module and a service module, wherein:

the access module is configured to: scan services hotspots and access to a first scanned service hotspot;

the component management module is configured to: after the access module accesses to the first service hotspot, acquire an available service list from the first service hotspot, and request the first service hotspot for a download address of a service component to be used according to the acquired available service list, and if the service component to be used needs to be downloaded or updated, download or update and install the service component to be used according to the download address, and then load the service component to be used;

the service module is configured to: receive data sent by peripherals, select a corresponding service component to send the data sent by the peripherals to the first service hotspot, and receive a data processing result returned by the first service hotspot.

8. The smart home terminal of claim 7, wherein, the component management module is configured to: select a service component to be used according to the available service list, notify the first service hotspot of the service component to be used, a communication mode supported by itself and a version of the service component which has been installed by itself, and request a download address of the service component to be used.

9. A smart home service hotspot, comprising: a processor; and a memory storing software modules to be executed by said processor, the software modules comprising: a hotspot deployment and session management module, a content releasing module, a service processing module and an interconnecting module, wherein the hotspot deployment and session management module, the content releasing module and the service processing modules are respectively connected with the interconnecting module, wherein:

the hotspot deployment and session management module is configured to:

interact with a smart home terminal, and complete an access of the smart home terminal;

the content releasing module is configured to: after the smart home terminal accesses, release an available service list and a download address of a service component to be used by the smart home terminal to the smart home terminal according to a request from the smart home terminal, and if the smart home terminal downloads or updates the service component to be used, provide the smart home terminal with download or update of the service component to be used;

the service processing module is configured to: receive data sent by the smart home terminal, select a corresponding service component to process the data, and return a data processing result to the smart home terminal;

the interconnecting module is configured to: exchange data between the hotspot deployment and session management module, the content releasing module and the service processing module.

10. The smart home service hotspot of claim 9, wherein, the content releasing module is configured to: release a download address of the service component to be used by the smart home terminal to the smart home terminal according to the service component to be used acquired from the smart home terminal, a supported communication mode and a version of an installed service component.

\* \* \* \* \*